US006832509B2

(12) United States Patent
Morinaga et al.

(10) Patent No.: US 6,832,509 B2
(45) Date of Patent: Dec. 21, 2004

(54) FUEL VAPOR CONTROL SYSTEM WITH LEAK CHECK

(75) Inventors: Syujiro Morinaga, Takahama (JP); Yoshinori Maegawa, Obu (JP); Keiji Wakahara, Inazawa (JP); Makoto Miwa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/233,595

(22) Filed: Sep. 4, 2002

(65) Prior Publication Data

US 2003/0051540 A1 Mar. 20, 2003

(30) Foreign Application Priority Data

Sep. 4, 2001 (JP) ....................................... 2001-266637

(51) Int. Cl.[7] ............................................. G01M 19/00
(52) U.S. Cl. ..................................................... 73/118.1
(58) Field of Search ......................... 73/40, 118.1, 49.7, 73/49.2; 123/520, 518, 698

(56) References Cited

U.S. PATENT DOCUMENTS 5,146,902 A 9/1992 Cook et al.
5,263,462 A 11/1993 Reddy
5,317,909 A 6/1994 Yamada et al.
5,427,075 A * 6/1995 Yamanaka et al. .......... 123/520
5,495,842 A * 3/1996 Yamanaka et al. .......... 123/520
5,685,285 A * 11/1997 Ohtani et al. ............... 123/698
5,890,474 A * 4/1999 Schnaibel et al. .......... 123/520
5,911,209 A * 6/1999 Kouda et al. ............... 123/520
6,220,229 B1 * 4/2001 Kawamura et al. ......... 123/520
6,276,343 B1 * 8/2001 Kawamura et al. ......... 123/520
6,276,344 B1 * 8/2001 Isobe et al. ................. 123/520
6,289,880 B1 * 9/2001 Yamaguchi et al. ........ 123/520
6,321,727 B1 * 11/2001 Reddy et al. ............... 123/520
6,336,446 B1 * 1/2002 Isobe et al. ................. 123/520

* cited by examiner

*Primary Examiner*—Edward Lefkowitz
*Assistant Examiner*—Octavia Davis
(74) *Attorney, Agent, or Firm*—Nixon & Vanderhye P.C.

(57) ABSTRACT

A fuel vapor control system has a controller that carries out a leak check processing after the engine is stopped. The controller includes a device that intermittently activates the controller itself or a part of the controller to sample an internal pressure of the fuel vapor passage. Then, after a predetermined time, the controller determines that whether the sampled values of the internal pressure indicate a leak or not by evaluating the sampled values. According to the arrangement, since at least a part of the controller is activated intermittently, the consumption of electricity can be reduced. The fuel vapor control system has a canister valve and a purge valve made of normally close type valves in order to reduce the consumption of electricity after the engine is stopped.

32 Claims, 5 Drawing Sheets

FUEL VAPOR CONTROL SYSTEM WITH LEAK CHECK

CROSS REFERENCE TO RELATED APPLICATION

This application is based on Japanese Patent Application No. 2001-266637 filed on Sep. 4, 2001 the contents of which are incorporated herein by reference.

BACKGROUND OF THE INVENTION

1. Field of the Invention

The present invention relates to a fuel vapor control system that prevents fuel vapor from being emitted to the atmosphere, specifically the fuel vapor control system having a controller for performing a self leak check.

2. Description of Related Art

The fuel vapor control system has a canister that contains an adsorbent for adsorbing fuel vapor from a fuel tank during operation of a fuel consuming device such as when an engine is not activated. The fuel vapor adsorbed in the canister is desorbed and purged into the engine when the engine is activated and the fuel vapor is consumed. In the fuel vapor control system, a purge valve is disposed between the canister and an intake pipe of the engine in order to control a purge amount in an appropriate amount. Further, in order to control a communication between the canister and the atmosphere, a canister valve is disposed between the canister and the atmosphere.

In order to ensure the function of the fuel vapor control system, it is important to detect a leak on the fuel vapor control system in an early stage. The leak may be detected by monitoring an internal pressure of the fuel vapor control system when the fuel vapor control system is closed. For example, the internal pressure of the fuel vapor control system may be represented by a gas pressure in the fuel tank, and takes an unexpected change if the system has a leak. The leak check can be carried out either when the engine is activated or when the engine is not activated. However, the leak check should be carried out during a time when the fuel vapor control system is in a stable condition. The stable condition may be obtained more frequently when the engine is not activated.

U.S. Pat. No. 5,263,462 discloses the leak check apparatus and method in which the leak check procedure is carried out while the engine is not activated.

Generally, the engine drives a generator to supply electricity to the fuel vapor control system and a battery. Therefore, if the leak check is carried out while the engine is not activated, the battery alone supplies power to the fuel vapor control system. As a result, the battery may over discharge electricity while executing the leak check.

Further, in order to improve an accuracy of the leak check, a period of time for the leak check procedure should be extended as long as possible. However, since a capacity of the battery is limited, it is difficult to obtain such a longer period of time for the leak check.

Further, in order to maintain the fuel vapor control system in a closed condition during the leak check procedure, the valves disposed in the fuel vapor control system also consumes the electricity of the battery.

SUMMARY OF THE INVENTION

It is an object of the present invention to provide a fuel vapor control system that is capable of reducing the consumption of electricity for carrying out the leak check.

It is an object of the present invention to provide a fuel vapor control system that is capable of extending a period of time for the leak check that is carried out while the engine is not activated.

According to a first aspect of the present invention, a leak check is carried out after the engine is stopped. During the leak check, the fuel vapor passage is closed as a closed chamber. In the fuel vapor passage, the internal pressure will be changed as the temperature of the fuel vapor is changed after the engine is stopped. The internal pressure of the fuel vapor passage demonstrates an existence of the leak or not. The internal pressure is sampled intermittently. Specifically, the intermittent sampling is carried out by activating a component for sampling the internal pressure. Therefore, the component can be deactivated between the sampling timings. It is possible to reduce the consumption of electricity.

According to the present invention, it is possible to monitor the internal pressure for a long period of time with small power consumption. Therefore it is possible to keep electricity of the battery (i.e. maintain battery life).

According to another aspect of the present invention, the fuel vapor passage is closed by at least one valve that is capable of maintaining a closed condition without activation. Therefore, it is possible to reduce the consumption of electricity for activating the valve during the leak check.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
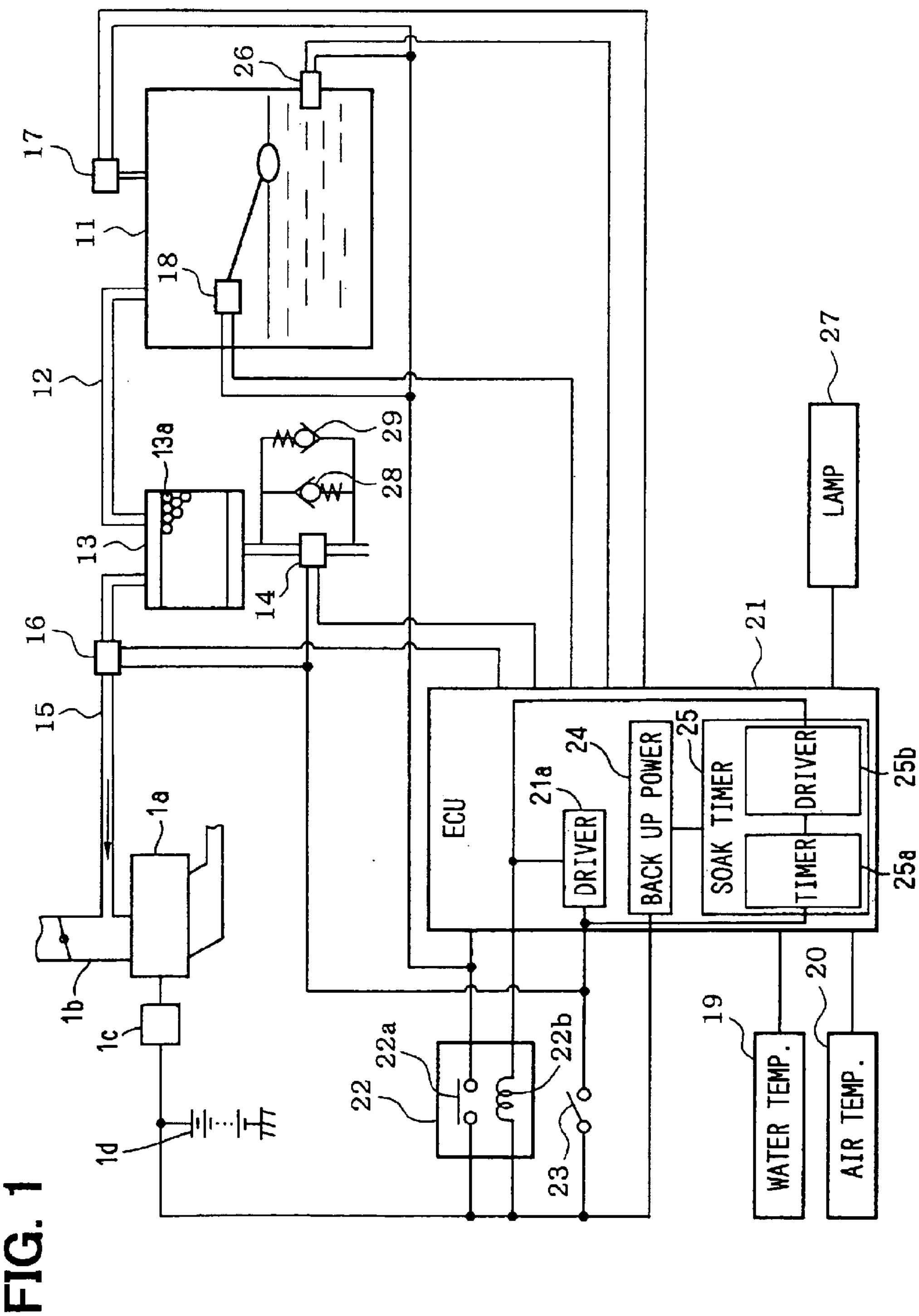
FIG. 1 is a block diagram of a fuel vapor control system for a vehicle according to a first embodiment of the present invention.
Figure 2:
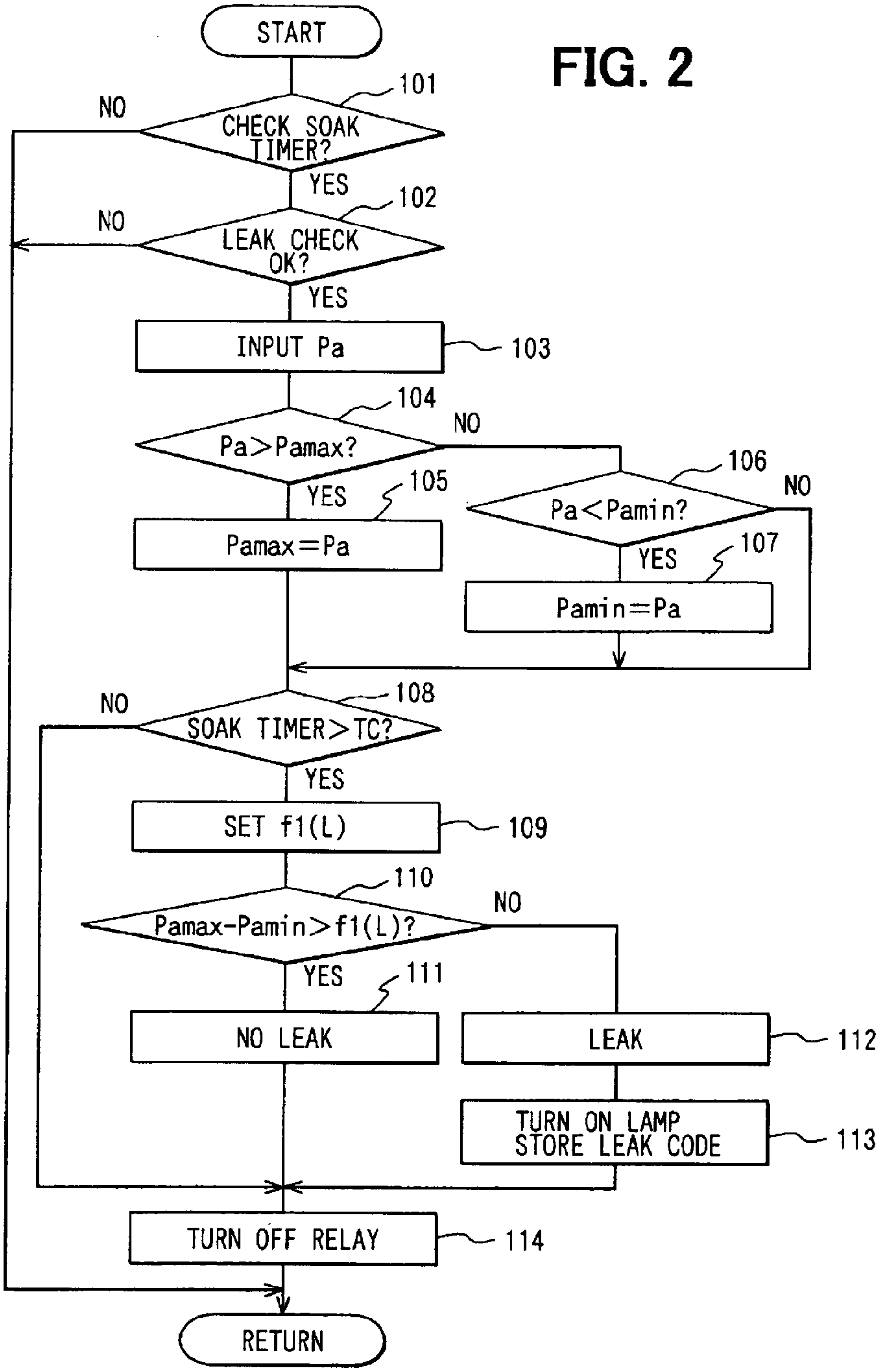
FIG. 2 is a flow chart showing a leak check process according to the first embodiment of the present invention.
Figure 3:
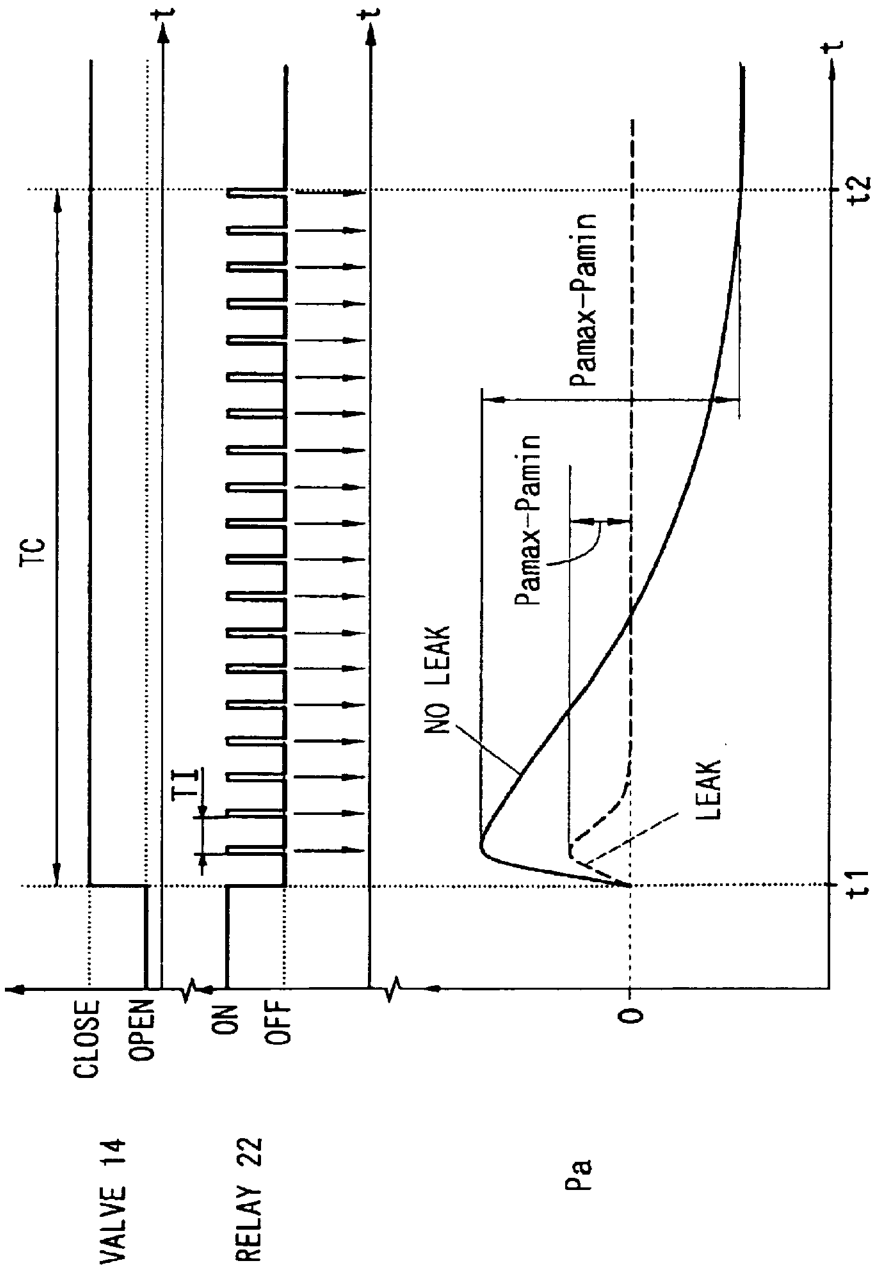
FIG. 3 is a time chart showing signals in the fuel vapor control system during the leak check process according to the first embodiment of the present invention.

FIGS. 1 to 3 show a first embodiment of a fuel vapor control system with leak check, which implements the present invention.

Referring to FIG. 1, the fuel vapor control system is disposed on a vehicle such as a car having an internal combustion engine 1*a*. The engine la has an intake passage 1*b*, and drives a generator 1*c* for supplying power to the fuel vapor control system and for charging a battery 1*d*. The fuel vapor control system has components of a fuel vapor passage and components of an electronic control system.

The fuel vapor passage has a fuel tank 11 that contains gasoline for an internal combustion engine for a vehicle. An upper space of the fuel tank 11 is connected to a first end of a canister 13 via a vapor conduit 12. The canister 13 contains adsorbent such as activated carbon pellets 13*a*. The adsorbent adsorbs fuel vapor from the fuel tank 11 during the engine is not activated. The canister 13 has a conduit on a second end thereof. The conduit communicates with the atmosphere. A canister valve 14 is disposed on the conduit. The fuel vapor is introduced into the canister 13 when the canister valve 14 opens the conduit. The canister valve 14 is an electromagnetic valve and is a normally close type valve. The canister valve 14 is capable of maintaining a closed condition during current is not supplied. The canister valve 14 opens the conduit during current is supplied. A relief valve 28 is disposed in parallel to the canister valve 14. The relief valve 28 defines an upper limit pressure in the fuel vapor passage. Another relief valve 29 is also disposed in parallel to the canister valve 14. The relief valve 29 defines a lower limit pressure in the fuel vapor passage.

The first end of the canister 13 is communicated with the intake passage 1*b* of the engine via a purge conduit 15. The intake passage 1*b* is maintained at a negative pressure during the engine is activated and operated in a certain condition. Therefore, the fuel vapor adsorbed in the canister 13 can be purged from the canister 13 and be introduced into the intake passage 1*b* when the engine is activated. A purge valve 16 is disposed on the purge conduit 15. The purge valve 16 controls a purge amount that is a flow amount through the purge conduit 15. The purge valve 16 is an electromagnetic valve and is a normally close type valve. Further, an electromagnetic actuator of the purge valve 16 is a linear control actuator that is capable of operating an opening degree of the purge valve 16 in accordance with a duty ratio of current.

The main components of the fuel vapor passage provide a closed chamber isolated from the atmosphere when both of the valves 14 and 16 are closed. The main components include the fuel tank 11, the vapor conduit 12, the canister 13, a part of the canister conduit and a part of the purge conduit 15. Therefore, the fuel vapor passage is in a closed condition when both of the canister valve 14 and the purge valve 16 are closed. In this embodiment, a closing means of the fuel vapor passage is provided by the valves 14 and 16. The components included in the closed chamber may be changed in accordance with a leak check requirement. For example, if a leak check for the fuel tank 11 alone is required, another valve may be disposed on the vapor conduit 12 for defining a closed chamber including the fuel tank 11 and a part of the vapor conduit 12.

The canister valve 14 and the purge valve 16 are also components of the electronic control system of the fuel vapor control system. The electronic control system further includes a pressure sensor 17 that is disposed on an upper portion of the fuel tank 11. The fuel tank 11 is a part of the fuel vapor passage which can be brought into a closed condition by the valves 14 and 16. Therefore, the pressure sensor 17 detects an internal pressure Pa of the fuel vapor passage. A fuel level sensor 18 is also disposed on the fuel tank 11. The fuel level sensor 18 detects a fuel level in the fuel tank 11. A fuel temperature sensor 26 is disposed in the fuel tank 11. The fuel temperature sensor 26 detects the fuel temperature Tf of the fuel in the fuel tank 11. A water temperature sensor 19 for detecting a water temperature Tw of a cooling water of the engine and a intake air temperature sensor 20 for detecting an air temperature in the intake passage of the engine are disposed on the engine.

An engine control unit (ECU) 21 is provided as a controller. The ECU 21 inputs signals from the sensors 17, 18, 19, 20 and 26. The ECU 21 has a microprocessor and peripheral devices including ROM, RAM, and I/O. The ECU 21 executes a fuel injection amount control, an ignition timing control, a purge control and a leak check. In the purge control, the ECU 21 controls the purge valve 16 so that the engine maintains appropriate condition even the fuel vapor is purged from the canister 13 and introduced into the intake passage 1*b*. In the leak check, the ECU 21 monitors the internal pressure of the fuel vapor passage and determines whether a leak exists or not.

The ECU 21 is powered by the battery i*d* mounted on the vehicle. A main relay 22 is disposed between the battery 1*d* and the ECU 21. The main relay 22 has a relay contact 22*a* and a coil 22*b*. The coil 22*b* is controlled by the ECU 21. An ignition switch 23 is connected to the ECU 21 to obtain a key switch signal indicative of an activation of the engine. The ECU 21 has a driver block 21*a* for driving the coil 22*b* in response to the ignition switch 23. The driver block 21*a* turns on the coil 22*b* during the ignition switch 23 is turned on. The main relay 22 supplies power to the sensors 17, 18, and 26 to activate them when the ECU 21 is activated. The ignition switch 23 supplies power to the canister valve 14 and the purge valve 16. Therefore, the valves 14 and 16 are deactivated during the time that engine is not activated. The ECU 21 has a back-up power source 24 and a soak timer 25. The back-up power source 24 is a small capacity battery that is able to activate the soak timer 25. The soak timer 25 measures an elapsed time from a turning off of the ignition switch 23. That is, the soak timer 25 measures an elapsed time from the engine is deactivated. The soak timer 25 intermittently turns on the coil 22*b* with a predetermined interval. The soak timer 25 also obtains a signal indicative of the elapsed time to the ECU 21 when the ECU 21 is activated by turning on the main relay 22. The soak timer 25 has a timer block 25*a* and a driver block 25*b*. The timer block 25*a* measures the elapsed time and obtains an intermittent trigger signal. The driver block 25*b* drives the coil 22*b* in response to the intermittent trigger signal. The soak timer 25 provides a power control block. The driver blocks 21*a* and 25*b* and the timer block 25*a* may be provided by hardware components or software components. A lamp 27 is connected to the ECU 21. The lamp 27 is activated as a warning indicator when the leak is detected.

The ECU 21 executes the leak check in accordance with a flowchart illustrated in FIG. 2. The ECU 21 executes a program corresponding to the flowchart in response to a turning on of the relay 22. The flowchart in FIG. 2 is started every turning on of the relay 22. For example, when the driver turns on the ignition switch 23, the relay 22 is turned by the driver block 21*a* and the ECU 21 starts a processing of the leak check. Further, after the engine is deactivated, the relay 22 is intermittently turned on by the driver block 25*b* and the ECU 21 starts a processing of the leak check.

The ECU 21 checks the soak timer 25 whether it is a leak check period after deactivating the engine or not in a step 101. The soak timer 25 measures the elapsed time from an engine deactivation. Therefore, if the routine is started in response to the ignition switch 23, the routine branches to "No" and finishes the processing. On the other hand, if the routine is started in response to the soak timer 25, the routine may branches to a step 102. Moreover, if the leak check period is elapsed, the routine branches to "No".

In the step 102, the ECU 21 determines whether a leak check condition is satisfied or not. In the step 102, the ECU 21 determines a prohibition or permission of the leak check based on a parameter indicative of a condition of fuel vapor in the fuel tank. For example, in this embodiment, the ECU 21 evaluates the fuel temperature Tf in the fuel tank 11. If the fuel temperature Tf is higher than a predetermined threshold value, the ECU 21 determines the leak check condition is satisfied and proceeds to a step 103. If the fuel temperature Tf is not higher than the predetermined threshold value, the ECU 21 skips the following steps. If the fuel temperature Tf is not higher than the threshold value, an internal pressure of the fuel vapor passage may not clearly indicate an existence of the leak. On the contrary, if the fuel temperature Tf is higher than the threshold value, the internal pressure of the fuel vapor passage will be changed in accordance with a change of the fuel temperature Tf after the engine is stopped and will demonstrate a significant difference indicative of the existence of the leak. Therefore, if an accurate leak check is not expected due to low fuel temperature, the ECU 21 skips the leak check processing. The fuel temperature Tf may be replaceable with a parameter that correlates with the fuel temperature. For example, a driving history of the vehicle before stopping the engine (driving time, or driving distance) or an operating condition of the engine (cooling water temperature Tw) can be used. For example, if the driving time is longer than a predetermined threshold, or if the driving distance is longer than a predetermined threshold, the ECU 21 determines the leak check condition is satisfied.

In the step 103, the ECU 21 inputs the internal pressure Pa from the pressure sensor 17. The step 103 is executed only when the ignition switch 23 is turned off, therefore, the valves 14 and 16 are closed due to no supply of drive current. Therefore, the internal pressure Pa detected in the step 103 indicates the internal pressure of the fuel vapor passage under a closed condition.

In a step 104, it is determined that whether or not the internal pressure Pa is higher than a maximum pressure Pamax. If the internal pressure Pa is higher than the maximum pressure Pamax, the value of the maximum pressure Pamax is renewed by the present value of the internal pressure Pa in a step 105. If the internal pressure Pa is not higher than the maximum pressure Pamax, it is determined that whether or not the internal pressure Pa is lower than a minimum pressure Pamin in a step 106. If the internal pressure Pa is lower than the minimum pressure Pamin, the value of the minimum pressure Pamin is renewed by the present value of the internal pressure Pa in a step 107. The steps 104 to 107 provide a maximum pressure learning block and a minimum pressure learning block. Further, the steps 103 to 107 provide a sampling block for sampling the internal pressure Pa with a predetermined interval defined by the soak timer 25.

In a step 108, the ECU 21 checks the soak timer 25 again. If the elapsed time measured by the soak timer 25 reaches to a predetermined leak check period TC, the ECU 21 proceeds to a steps 109 to 113 which provide a leak check block. If the soak timer 25 has not yet reached to the predetermined leak check period TC, the ECU 21 proceeds to a step 114. In the step 114, the ECU 21 turns off the relay 22 and wait until next activation by the soak timer 25.

In a step 109, the ECU 21 sets a threshold value f1(L). The threshold value f1(L) may be set by looking up a map defined by a parameter such as the fuel level L. The threshold value f1(L) may be obtained by a mathematical formula. The fuel level L is considered in determining the threshold value, because a pressure difference between the maximum pressure Pamax and the minimum pressure Pamin is influenced by the fuel level L.

In a step 110, it is determined that whether or not the pressure difference (Pamax−Pamin) is greater than the threshold value f1(L). If the pressure difference (Pamax−Pamin) is greater than the threshold value f1(L), the ECU 21 determines that no leak is detected in a step 111 because the internal pressure Pa has been changed significantly after deactivating the engine. On the contrary, if the pressure difference (Pamax−Pamin) is not greater than the threshold value f1(L), the ECU 21 determines that a leak is detected in a step 112, turns on the lamp 27 and stores a leak code indicative of an existence of the leak in a step 113. Then, the ECU 21 turns off the relay 22 in the step 114 to complete the sampling processing and the leak check processing.

FIG. 3 shows a time chart showing an operation of the first embodiment. The ignition switch 23 is turned off at t1. The valves 14 and 16 closes the fuel vapor passage in response to the ignition switch 23. The internal pressure Pa is increased due to a high fuel temperature Tf and the closed condition of the fuel vapor passage. Then, the internal pressure Pa is gradually decreased as the fuel temperature Tf is decreased and is condensed into liquid due to a temperature decrease. The internal pressure Pa saturates in a certain pressure. During the leak check (sampling) period TC, the ECU 21 samples the internal pressure Pa in response to the intermittent operation of the relay 22. Downward arrows in FIG. 3 show sampling timings for the internal pressure Pa. The sampling processing is completed at t2, and the leak check processing is executed at t2. If the fuel vapor passage has a leak, the internal pressure Pa saturates in the atmospheric pressure (0) due to the leak. However, if the fuel vapor passage has no leak, the internal pressure Pa fluctuates widely due to the temperature change after deactivating the engine. Therefore, the pressure difference (Pamax−Pamin) demonstrates the leak or not.

In this embodiment, most parts of the ECU 21 are not activated between the sampling timings. Therefore it is possible to reduce the consumption of electricity of the battery 1*d*.

Alternatively, the leak may be detected based on the maximum pressure Pamax because the maximum pressure Pamax demonstrates a significant difference between no leak and the existence of the leak. Further, the leak may be detected based on the minimum pressure Pamin alone.

Figure 4:
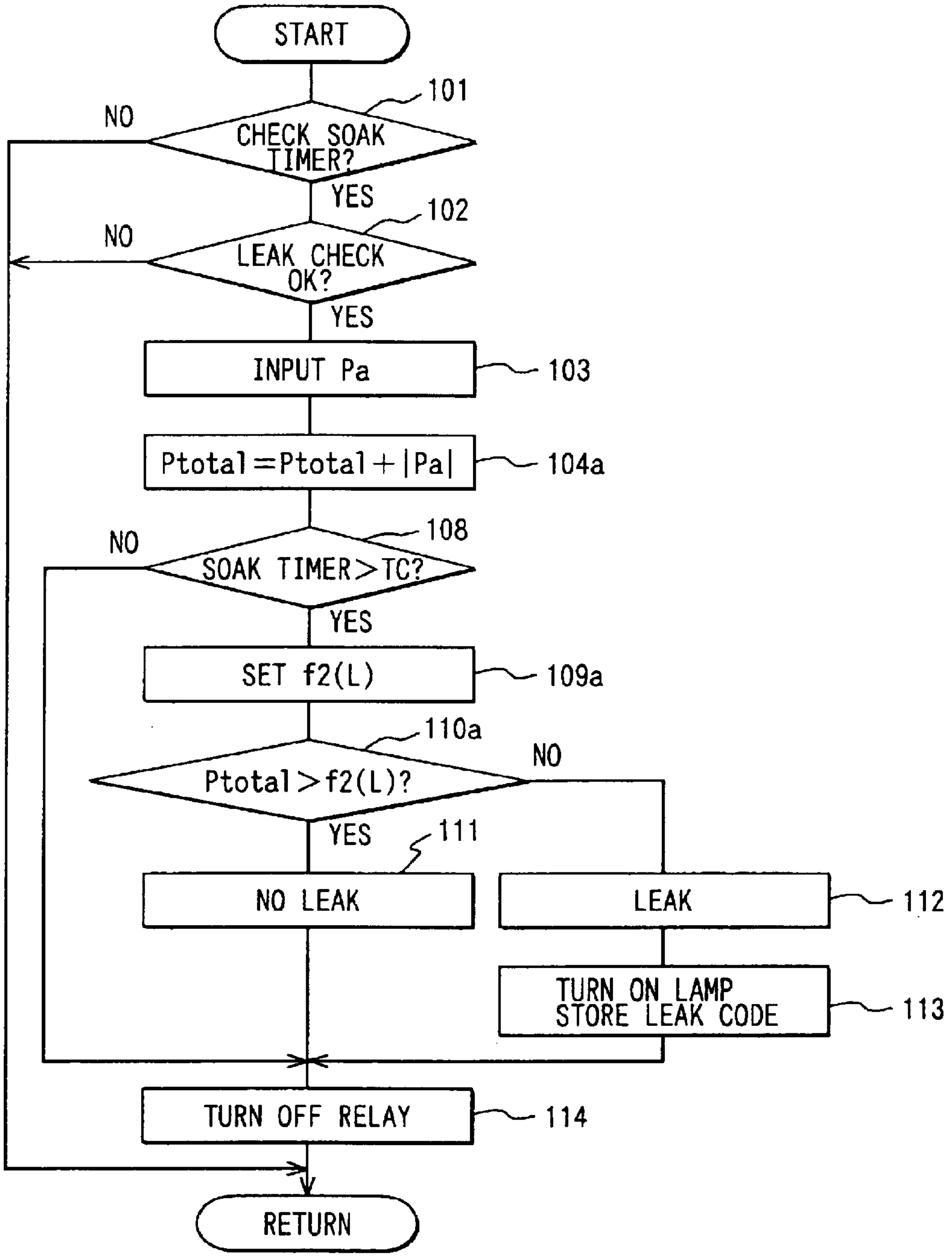
FIG. 4 is a flow chart showing a leak check process according to a second embodiment of the present invention.
Figure 5:
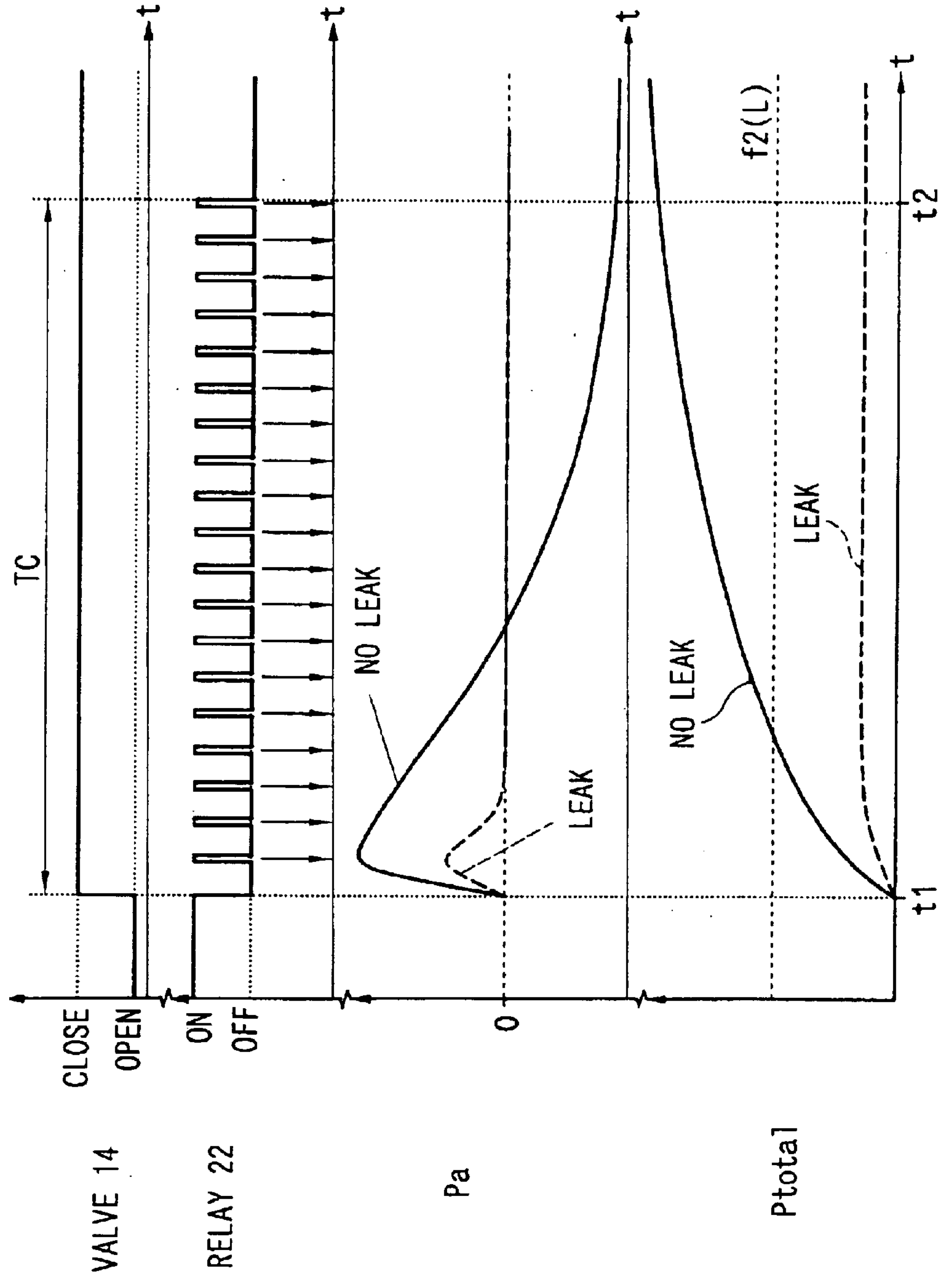
FIG. 5 is a time chart showing signals in the fuel vapor control system during the leak check process according to the second embodiment of the present invention.

Further, the leak may be detected based on an accumulated value of the internal pressure Pa. FIGS. 4 and 5 show a second embodiment of the present invention, which detects the leak based on the accumulated value of the internal pressure Pa.

Referring to FIG. 4, the same or similar steps as the first embodiment are indicated by the same reference numbers in order to avoid repeat description. In the second embodiment, a step 104*a* is executed instead of the steps 104 to 107. In the step 104*a*, the accumulated value Ptotal is calculated by summing an absolute value of the internal pressure Pa. Therefore, the accumulated value Ptotal reflects an amount of fluctuation of the internal pressure with respect to the atmospheric pressure (0). In the second embodiment, a step 109*a* and a step 110*a* are executed instead of the steps 109 and 110 respectively. In the step 109*a*, a threshold value f2(L) is set based on a map or a mathematical formula. In the step 110*a*, it is determined that whether or not the accumulated value Ptotal is greater than the threshold value f2(L). If the accumulated value Ptotal is greater than the threshold value f2(L), the ECU 21 determines that the fuel vapor passage has no leak. On the contrary, if the accumulated value Ptotal is not greater than the threshold value f2(L), the ECU 21 determines that the fuel vapor passage has a certain amount of leak and proceeds to the step 113.

FIG. 5 shows an operation of the second embodiment. The accumulated value Ptotal is saturated quickly in a small value due to a saturation of the internal pressure Pa into the atmospheric pressure (0) when the fuel vapor passage has a leak.

According to the second embodiment, since the leak check is executed based on the accumulated value, it is possible to reflect a time factor or history of fluctuation of the internal pressure into the leak check. As a result, it is possible to improve the accuracy of the leak check.

The sampling interval TI is set in a constant in the first and second embodiment, it is advantageous to simplify the processing of the ECU 21. However, the sampling interval TI may be set variable in order to improve the accuracy or in order to decrease number of samples. For example, the sampling interval TI may be varied in accordance with the elapsed time from deactivating the engine, a changing rate of the internal pressure Pa or a parameter correlates to them. For example, a relatively shorter interval may be used in a beginning period of the leak check period TC, because the internal pressure Pa varies quickly in the beginning period as shown in FIG. 3. Then, a relatively longer interval is used in order to decrease number of samples. In the case of the variable interval arrangement, it is possible to detect the maximum pressure accurately. It is also possible to avoid increase of number of samples.

The leak check period (sampling period) TC may be variable in accordance with the fuel temperature or a parameter that correlates to the fuel temperature. For example, a driving history of the vehicle such as a driving time or a driving distance may be used as the parameter. Moreover, an engine operating condition such as the water temperature Tw may be used as the parameter. The leak check period TC may be variable in order to set an appropriate period according to an amount of vapor.

A normally open type valve may be used as the canister valve 14. In this case, the ECU 21 activates the canister valve 14 to close the conduit during the leak check period TC. However, the consumption of electricity is still reduced due to the intermittent activation of the most parts of the ECU 21.

Further, the canister valve 14 and the relief valves 28 and 29 may be replaced with a power saving type valve which needs activation only when switching valve conditions between open and close. For example, the power saving type valve has a permanent magnet for keeping an open condition or a close condition without activation, a coil for switching the condition from open to close and a coil for switching the condition from close to open. In this case, the ECU 21 activates the power saving type valve to close the conduit when the engine is stopped. Then, the ECU 21 activates the power saving type valve to open the conduit when the leak check processing is completed.

Further, the step 108 may be removed in order to obtain a result of the leak check in an early stage. In this case, the leak check processing (steps 109–113, or steps 109*a*–113) is carried out in every sampling timings. Therefore, if the detected value reaches to the threshold value, the ECU 21 can determine no leak before an elapse of the leak check period TC. It is possible to reduce the consumption of electricity further.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A fuel vapor control system for a fuel supply system of an engine, comprising:

means for detecting an internal pressure of a fuel vapor passage including a fuel tank;

means for closing the fuel vapor passage during a leak check period in which a leak check is carried out when the engine is not activated;

means, activated intermittently in the leak check period, for sampling the internal pressure intermittently in response to the activation so that the means for sampling consumes electrical power when activated to perform the sampling and does not consume electrical power when deactivated between sampling timings; and means for determining a leak or not based on the sampled values of the internal pressure sampled by the sampling means.

2. The fuel vapor control system according to claim 1, wherein the sampling means is intermittently supplied the electrical power from a battery so that the battery supplies electrical power to the sampling means when the sampling means is activated and does not supply electrical power to the sampling means when the sampling means is deactivated.

3. The fuel vapor control system according to claim 1, wherein the determining means determines the leak or not based on a difference between a maximum pressure of the sampled values and a minimum pressure of the sampled values.

4. The fuel vapor control system according to claim 3, wherein the determining means determines the leak when the difference is smaller than a predetermined value.

5. The fuel vapor control system according to claim 1, wherein the determining means determines the leak or not based on a maximum pressure of the sampled values.

6. The fuel vapor control system according to claim 5, wherein the determining means determines the leak when the maximum pressure is smaller than a predetermined value.

7. The fuel vapor control system according to claim 1, wherein the determining means determines a leak or not based on an accumulated value of the sampled values.

8. The fuel vapor control system according to claim 7, wherein the accumulated value is calculated by accumulating absolute values of the sampled values.

9. The fuel vapor control system according to claim 1, wherein the closing means includes:

a normally close type valve which is capable of maintaining a closed condition without activation; and a relief valve which defines an upper limit pressure in the fuel vapor passage.

10. The fuel vapor control system according to claim 1, further comprising:

a canister that adsorbs fuel vapor from the fuel tank, wherein the closing means includes:

a purge valve disposed between the canister and an intake passage of the engine, the purge valve being capable of maintaining a closed condition without activation; and a canister valve disposed between the canister and the atmosphere, the canister valve being capable of maintaining a closed condition without activation.

11. The fuel vapor control system according to claim 1, wherein the sampling means varies a sampling interval in accordance with at least one of an elapsed time of the leak check, a changing rate of the internal pressure and a parameter correlating to the elapsed time or the changing rate.

12. The fuel vapor control system according to claim 11, wherein the sampling interval is set relatively shorter in a beginning of the leak check than that in an ending of the leak check.

13. The fuel vapor control system according to claim 1, further comprising means for determining a prohibition or permission of the leak check based on a parameter indicative of a condition of fuel vapor in the fuel tank.

14. The fuel vapor control system according to claim 13, wherein the parameter is a fuel temperature or a driving history of a vehicle that is indicative of the condition of fuel vapor in which the internal pressure clearly shows the leak or not.

15. A fuel vapor control system for a fuel supply system of an engine, comprising:

a valve that closes a passage to define a closed chamber including a part of the fuel vapor passage;

a pressure sensor disposed on the closed chamber to detect an internal pressure of the closed chamber;

a controller that inputs a signal from the pressure sensor and operates the valve in a closed condition when a leak check is carried out when an engine is not activated, wherein the controller includes:

a power control block that intermittently turns on power supply when the leak check is carried out;

a sampling block that is intermittently activated by being supplied power from the power control block and samples the internal pressure detected by the pressure sensor in response to an activation and that is deactivated by not being supplied power from the power control block between sampling timings; and a leak check block that determines a leak or not based on values of the internal pressure sampled by the sampling block.

16. The fuel vapor control system according to claim 15, wherein the power control block intermittently turns on power of the controller, and the valve is capable of maintaining a closed condition when the controller is not supplied power.

17. The fuel vapor control system according to claim 15, wherein the controller is activated from an off condition, in which the power is not supplied, when the leak check is carried out.

18. The fuel vapor control system according to claim 1, wherein the sampling means is intermittently activated from an off condition, in which the power is not supplied, during the leak check period.

19. A method of controlling fuel vapor in a fuel supply system of an engine, the method comprising:

detecting an internal pressure of a fuel vapor passage including a fuel tank;

closing the fuel vapor passage during a leak check period in which a leak check is carried out when the engine is not activated;

sampling, using a sampling device, the internal pressure intermittently in response to intermittent activation of the sampling device during the leak check period so that the sampling device consumes electrical power when activated to perform the sampling and does not consume electrical power when deactivated between sampling timings; and determining a leak or not based on the sampled values of the internal pressure sampled by the sampling device.

20. The method according to claim 19, wherein the sampling device is intermittently supplied the electrical power from a battery so that the battery supplies electrical power to the sampling device when the sampling device is activated and does not supply electrical power to the sampling device when the sampling device is deactivated.

21. The method according to claim 19, wherein determining the leak or not is based on a difference between a maximum pressure of the sampled values and a minimum pressure of the sampled values.

22. The method according to claim 21, wherein the determining comprises determining that the leak is present when the difference is smaller than a predetermined value.

23. The method according to claim 19, wherein determining the leak or not is based on a maximum pressure of the sampled values.

24. The method according to claim 23, wherein the determining comprises determining that the leak is present when the maximum pressure is smaller than a predetermined value.

25. The method according to claim 19, wherein determining the leak or not is based on an accumulated value of the sampled values.

26. The method according to claim 25, wherein the accumulated value is calculated by accumulating absolute values of the sampled values.

27. The method according to claim 19, wherein closing the fuel vapor passage is accomplished by a normally close type valve which is capable of maintaining a closed condition without activation, and a relief valve which defines an upper limit pressure in the fuel vapor passage.

28. The method according to claim 19, further comprising;

absorbing fuel vapor from the fuel tank in a canister, and wherein closing the fuel vapor passage includes:

disposing a purge valve between the canister and an intake passage of the engine, the purge valve being capable of maintaining a closed condition without activation; and disposing a canister valve between the canister and the atmosphere, the canister valve being capable of maintaining a closed condition without activation.

29. The method according to claim 19, wherein the sampling includes varying a sampling interval in accordance with at least one of an elapsed time of the leak check, a changing rate of the internal pressure and a parameter correlating to the elapsed time or the changing rate.

30. The method according to claim 29, wherein the sampling interval is set relatively shorter in a beginning of the leak check than that in an ending of the leak check.

31. The method according to claim 19, further comprising determining a prohibition or permission of the leak check based on a parameter indicative of a condition of fuel vapor in the fuel tank.

32. The method according to claim 31, wherein the parameter is a fuel temperature or a driving history of a vehicle that is indicative of the condition of fuel vapor in which the internal pressure clearly shows the leak or not.

* * * * *